United States Patent [19]

Haneji et al.

[11] 3,977,024

[45] Aug. 24, 1976

[54] RECORDING AND/OR REPRODUCING APPARATUS EMPLOYING A ROTATING RECORDING MEDIUM

[75] Inventors: Yasuo Haneji; Hisao Kinjo, both of Yokohama, Japan

[73] Assignee: Victor Company of Japan, Limited, Yokohama, Japan

[22] Filed: May 23, 1974

[21] Appl. No.: 472,547

[30] Foreign Application Priority Data

May 24, 1973 Japan.................................. 48-57133
Oct. 31, 1973 Japan............................. 48-121797

[52] U.S. Cl.................................. 360/78; 318/685; 318/696; 360/77
[51] Int. Cl.².................. G11B 21/10; G11B 21/08; G05B 19/40
[58] Field of Search ................ 360/78, 77; 318/685, 318/696

[56] References Cited
UNITED STATES PATENTS

| | | | |
|---|---|---|---|
| 3,562,725 | 2/1971 | Klein et al. ............................ | 360/77 |
| 3,637,928 | 1/1972 | Poulett................................... | 360/78 |
| 3,681,525 | 8/1972 | Wada et al............................. | 360/78 |

*Primary Examiner*—Robert S. Tupper

[57] ABSTRACT

A recording and/or reproducing apparatus comprises a pulse motor for driving a head in an intermittent stepping operation across a rotating recording medium. A circuit successively passes mutually unequal currents through the stator windings of the pulse motor, thereby to drive the pulse motor responsive to the unbalanced excitation. The rotor of the pulse motor stops intermittently at positions which are offset, in the rotational direction, with respect to the stopping positions which would occur if equal excitation currents are passed through the stator windings.

4 Claims, 74 Drawing Figures

RECORDING AND/OR REPRODUCING APPARATUS EMPLOYING A ROTATING RECORDING MEDIUM

BACKGROUND OF THE INVENTION

This invention relates generally to a recording and/or reproducing apparatus in which a rotating recording medium is used. More particularly, the invention relates to a recording head driven by a pulse motor which head intermittently steps over a rotating recording medium. The pulse motor is driven by unbalanced excitation.

Heretofore, an apparatus has been used for obtaining video pictures which are reproduced at any speed by previously rotating a disc-formed, magnetic recording medium at high speed and in synchronism with the vertical synchronizing signal of a video signal. A magnetic head intermittently steps over and in contact with the surface of the recording medium. The head steps radially to form concentric, circular recording tracks. One field signal or a plurality of field signals are recorded on each track. At the time of reproducing, the speed of the reproduced picture is changed by varying the moving speed of the magnetic head.

The intermittent movement of the magnetic head is ordinarily accomplished by a pulse motor which turns through a predetermined rotational angle, which is a displacement proportional to the number of input pulses. The stopping position of this pulse motor is determined by its construction, and by the number of input pulses. Accordingly, there is no necessity for a servo-loop giving a positional detection of the stopping position. Therefore, this pulse motor accomplishes a simple control with an open loop, in accordance with the number of input pulses.

However, by the use of this pulse motor, the intermittent stopping positions of the magnetic head cannot be varied. For this reason, if a magnetic medium on which a video signal has been previously recorded is to be reproduced by another apparatus, of if a magnetic recording medium which has been recorded has been preserved for a long time and is to be reproduced by the same recording/reproducing apparatus, an accurate and positive tracking operation of the magnetic head becomes extremely difficult. Then, a normal reproduced picture cannot be obtained.

Furthermore, in order to cause the head to intermittently step over the recording medium in a manner such that the forward travel tracks and the return travel tracks are concentric and, at the same time, are mutually alternating, it is necessary to step by two track pitches at the time of ordinary stepping and to step by only one track pitch when the stepping direction is reversed. Accordingly, it has been the prior art practice to impress two driving pulses on the pulse motor at the time of ordinary head stepping and to impress a single pulse at the time of reversing the stepping direction. The changing of the number of applied pulses in this manner, necessitates a complicated circuitry.

SUMMARY OF THE INVENTION

Accordingly, it is a general object of the present invention to provide a novel and useful recording/reproducing apparatus, employing a rotating recording medium in which the above described difficulties have been overcome.

A specific object of the invention is to provide a recording/reproducing apparatus, of the type referred to above, in which the stopping position of the rotor of the pulse motor can be variably adjusted by controllably adjusting the rotational drive of the pulse motor. By the pulse motor driving system, in the apparatus according to this invention, mutually different currents are applied to the stator windings of the pulse motor (this being herein referred to as "unbalanced excitation"). The stopping position of the rotor is different from the stopping position when equal currents are passed through stator windings.

Another object of the invention is to provide a recording/reproducing apparatus using the unbalanced excitation method to drive the pulse motor, without changing the number of impressed driving pulses, at the time of reversing of rotational direction of the pulse motor, so that the forward path tracks and the return path tracks become mutually alternating.

Other objects and further features of the invention will become apparent from the following detailed description when read in conjunction with the accompanying drawings.

DETAILED DESCRIPTION

Figure 1:
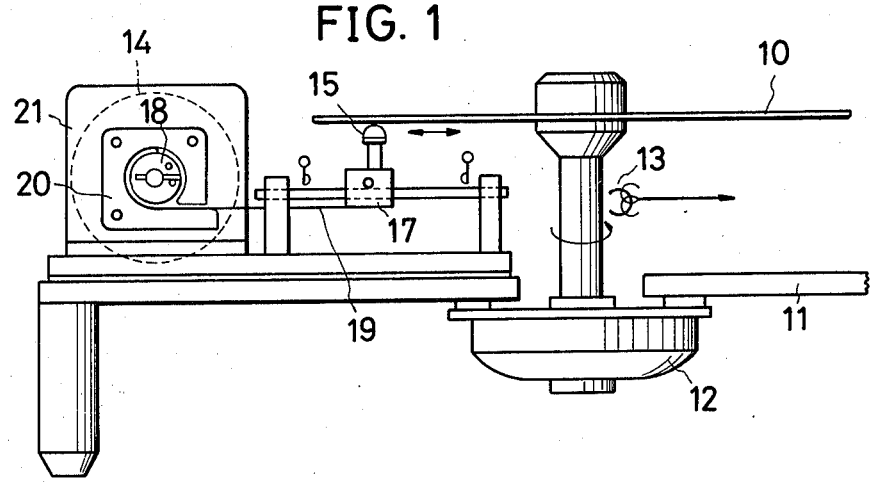
FIG. 1 is a side elevation of an essential part of a recording and reproducing apparatus of the type using a rotating recording medium, according to this invention.

Referring to FIG. 1, a rotating record medium 10 (of disc or sheet form) is fixed to a rotating shaft of a disc motor 12 mounted on a chassis 11. During reproduction, motor 12 synchronizes the rotating record medium 10, in phase, with vertical synchronizing signals of the recorded video signals, responsive to a signal from a tone wheel pulse generator 13. Motor 12 is driven at a rotating speed of 3,600 rpm.

A pulse motor 14 is driven intermittently and synchronized with the vertical synchronizing signals of the recorded video signals and with the control pulse signal in reproduction.

A video head assembly 15 is transferred intermittently in steps, in the radial direction of the recording medium 10. Movement may be either toward the outer peripheral or the inner peripheral direction. The head movement is intermittent and responsive to a step driving mechanism. The mechanism may step clockwise or counterclockwise responsive to intermittent movement of the motor 14.

The video head assembly 15 is mounted on a head pedestal 17 fitted on a guide member 16. To a rotating member 18 mounted rigidly on a rotating shaft of the pulse motor 14, one end of a steel belt 19 is rigidly anchored. The other end of the steel belt 19 is anchored to the head pedestal 17. A belt guide 20, for guiding the steel belt 19, is rigidly fixed to a bracket 21. The pulse motor 14 drives video head 15 intermittently by steps at two-track pitch intervals in the forward direction, scanning tracks $Gto$, $Gt1$, $Gt2$ ... $Gt(n-2)$, and $Gt(n-1)$ and the track $Gtn(Bto)$. Motor 14 drives the head 15 on track pitch when it reaches the innermost peripheral track.

Thereafter, the video head 15 reverses its stepping direction and intermittently steps at two-track pitch intervals in the reverse direction, sacnning tracks $Bto$, $Bt1$, $Bt2$ ... $Bt(n-2)$, and $Bt(n-1)$ in succession, and then the track $Btn(Gto)$ by stepping one track pitch when the video head 15 reaches the outermost peripheral track.

Thereafter, the video head 15 reverses its stepping direction, continuing the above-mentioned operation endlessly, to a desired time point.

The forward-and-reverse tracks are formed on the recording medium alternately and concentrically.

There are problems when recording is on one machine and reproduction is on another machine. There are also problems when the same apparatus as used for both recording and reproducing. Hence, there is a need for a variable adjustment the stopping position of the video head 15, after each intermittent stepping operation, in order for it to perfectly track. For instance, the rotating recording medium may become deformed, even the slightest degree, because of storage for a long period of time.

In accordance with the present invention, the video head intermittently steps with a variably adjustable stopping position of the video head.

The driving principles as well as the variable stopping position principles of a three-phase-winding, double excitation system pulse motor will now be described.

Figure 3:
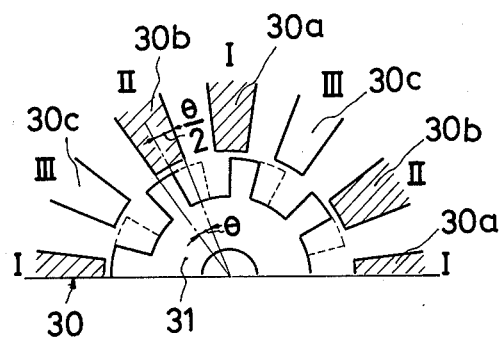
FIGS. 3 and 4 are diagrams respectively indicating the operating principles of a three-phase, double-excitation system pulse motor for use in the apparatus according to this invention.

Referring to FIG. 3, a stator assembly 30 comprises a plurality of groups of stators. Each group comprises first phase (I), second phase (II), and third phase (III) stators 30$a$, 30$b$, and 30$c$. A rotor 31 is stopped in a balanced rotary position, being attracted to the stators 30$a$ and 30$b$ when the stators 30$a$ and 30$b$ of the first and second phases of the stator 31 are excited. By switching a pair of excitation phases to another, with the stators 30$a$ and 30$b$ in excited state, such as phases I and II → phases II and III → phases III and I, the rotor 31 is caused to intermittently rotates counterclockwise. Reversing the excitation phase causes the rotor 31 to rotate intermittently clockwise.

Figure 4:
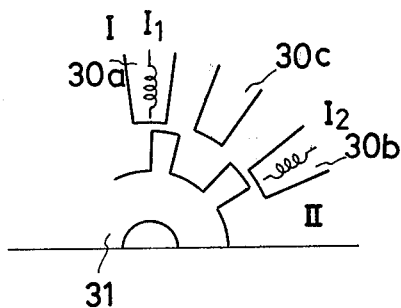

FIG. 4 shows a state in which the stators 30$a$ and 30$b$ of the I and II phases in the stator assembly 30 are energized by the exciting currents I1 and I2.

Figure 5A:
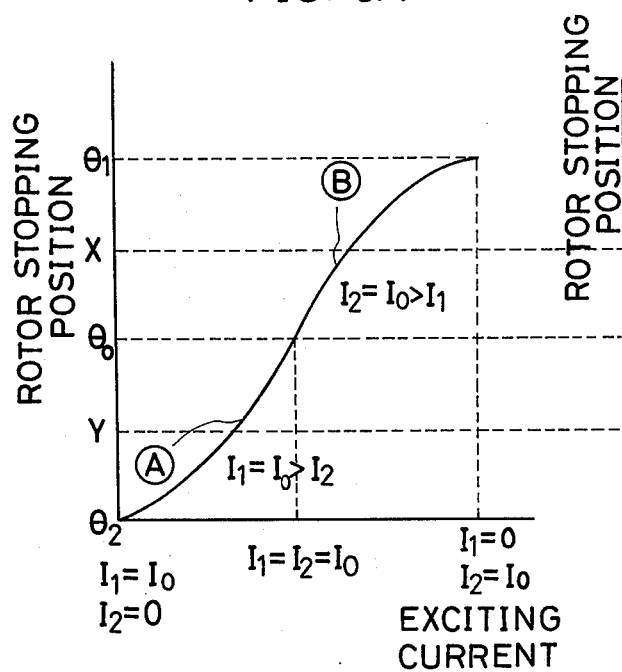
FIGS. 5A and 5B are graphs respectively indicating the rotor stopping positional relationships with respect to the exciting current of the three-phase, double-excitation system pulse motor.
Figure 5B:
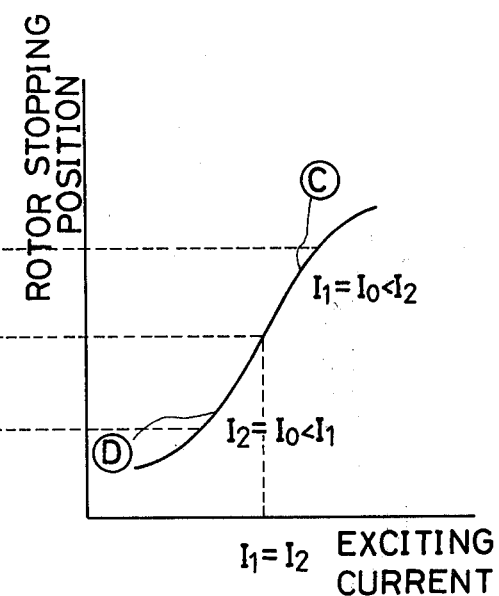

FIGS. 5A and 5B illustrate the relationships between the currents I1 and I2 and the stopping positions of the rotor 31.

If the exciting currents I1 and I2 are I1 = I2 = Io, the rotor 31 stops at the double excitation stability point $\theta o$ indicated in FIG. 5A. When the current I2 is decreased with the exciting current I1 held constant at Io, the rotor 31 is attracted clockwise toward one of the stators of the excitation phase having a greater exciting current. On reaching a point I2 = 0, the rotor comes to a stop at a one excitation stability point $\theta 2$. Conversely, on decreasing the current I2 gradually with the exciting current I2 maintained constant at Io, the rotor 31 rotates counterclockwise and comes to a stop at the other one excitation stability point $\theta 1$.

Curve Ⓐ represents a continuous stabilization characteristic curve between the double excitation stability point $\theta o$ and the one excitation stability point $\theta 2$. Likewise, curve Ⓑ represents a continuous stabilization characteristic curve between the double excitation stability point $\theta o$ and the one excitation stability point $\theta 1$.

Incidentally, each of these characteristic curves differ with the kind of pulse motor. Points X and Y in these figures indicate the stopping positions of the rotor 3 at the intermediate points between the double and one excitation stability points.

FIG. 5 illustrates a stabilization characteristic curve for a case where both exciting currents I1 and I2 become greater than the exciting current Io. Curve Ⓒ represents a characteristic where the II phase exciting current I2 is increased greater than the I1 phase exciting current with I1 held constant. Curve Ⓓ indicates a characteristic for a reverse case where the I phase exciting current I1 is increased greater than the II phase exciting current I2, with I2 maintained constant.

Incidentally, the curves Ⓒ and Ⓓ are also provided with the intermediate stopping points X and Y, in the same way as the curves Ⓐ and Ⓑ, between the one and double excitation stopping positions.

In this manner, increasing or decreasing one exciting current with the other held constant enables the rotating position of the rotor to be varied with respect to the stator.

Figure 6A:
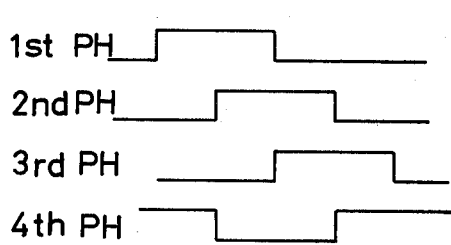
FIGS. 6A through 6C and FIGS. 7A through 7C are time charts respectively indicating level variations, with respect to time, of currents for driving a four-phase double-excitation system pulse motor.
Figure 6B:
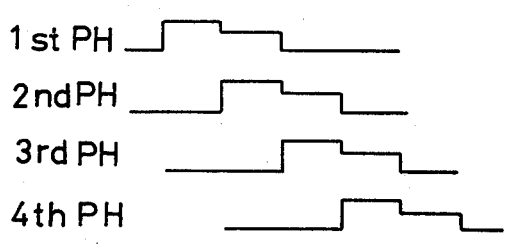
Figure 6C:
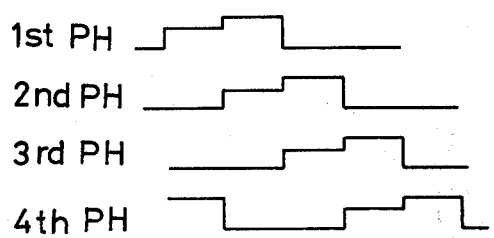

FIGS. 6A through 6C and FIGS. 7A through 7C indicate variation in the level of the currents, with respect to time, for a four-phase double excitation pulse motor 14. FIGS. 6A through 6C illustrate the current conducting mode for the excitation windings where the rotor is driven in normal direction. It is to be understood that the current for the excitation phases is switched in the sequence of the first (I) phase, the second (II) phase → the second and the third (III) phase → the third and the fourth (IV) phase → the fourth and the first phase.

FIG. 6A illustrates the ordinary current conducting mode, on the assumption that the level of the exciting current is constant with respect to each excitation phase. In this case, the rotor rotates intermittently in a forward direction, stopping at the double excitation stability point. FIG. 6B indicates the exciting current mode in the case of advanced phase driving. The immediately preceding excitation phase current level is always greater than the succeeding excitation phase current level. The rotor rotates intermittently, stopping at a position advanced by a predetermined electrical angle from the normal stopping position. FIG. 6C illustrates the exciting current mode in delayed phase driving. The current level of the immediately succeeding excitation phase is greater than that of the preceding excitation phase. The rotor rotates intermittently, stopping at a position delayed a predetermined electrical angle from the normal stopping position.

Figure 7A:
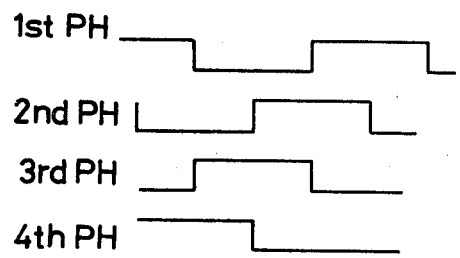
Figure 7B:
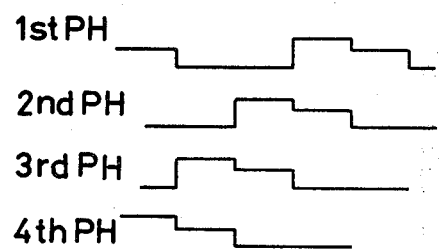
Figure 7C:
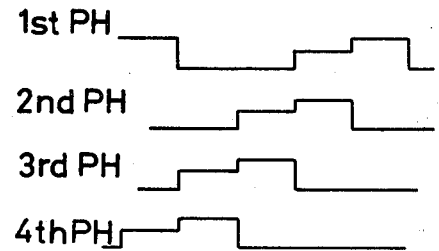

FIGS. 7A through 7C illustrate a current conducting mode for a case where the rotor is rotated in the reverse direction. It is seen that the current for the excitation phases is switched in the sequence IV and III phases → III and II phases → II and I phases → and I and IV phases. FIG. 7A illustrates a current mode when the level of the exciting current for each excitation phase is constant. The rotor rotates intermittently in the reverse direction, stopping at the double excitation stability point. FIG. 7B shows an exciting current mode for an advanced phase period. As in FIG. 6B the level of current for the immediately preceding excitation phase is always at a value greater than the current level of the succeeding excitation phase. FIG. 7C shows an exciting current mode for a delayed phase period. The current level for the succeeding excitation phase is always greater than that for the preceding excitation phase, similarly to FIG. 6C.

It is possible, as mentioned previously, to change suitably the rotor stopping position to a position preceding or succeeding the double excitation stability point by varying the conducting current mode. The magnetic head stopping position may thus be varied to achieve normal tracking.

In the previously mentioned double excitation system, at least one excitation phase for the stator is invariably energized in switching the exciting current, thereby performing stabilized control operation.

Next to be described are a pulse generating circuit and a pulse motor driving amplifier circuit, which constitute the essential part of the present invention for forming the current level for each excitation phase.

Figure 8:
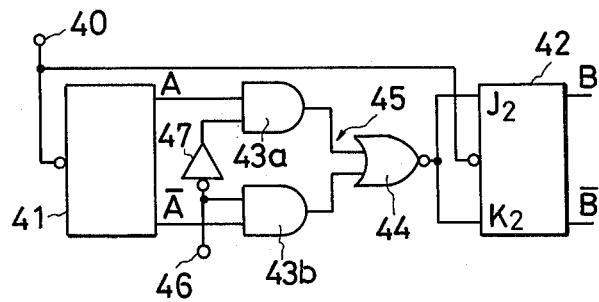
FIG. 8 is a circuit diagram of one embodiment of a pulse generating circuit.
Figure 11:
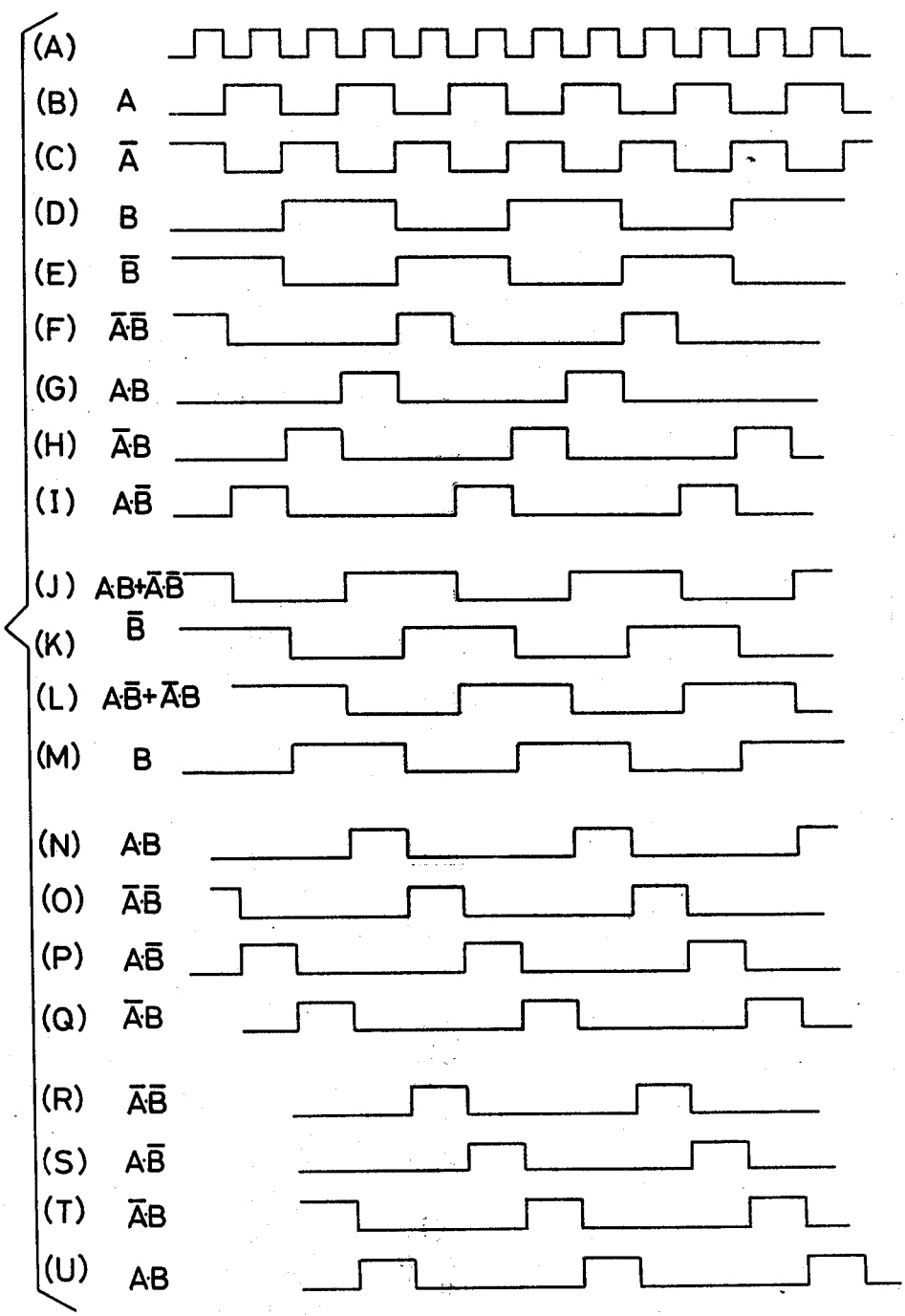
FIGS. 11(A) through 11(U) are pulse signal waveform diagrams respectively indicating the operation when the pulse motor in the apparatus according to this invention is driven in normal or forward direction.
Figure 12:
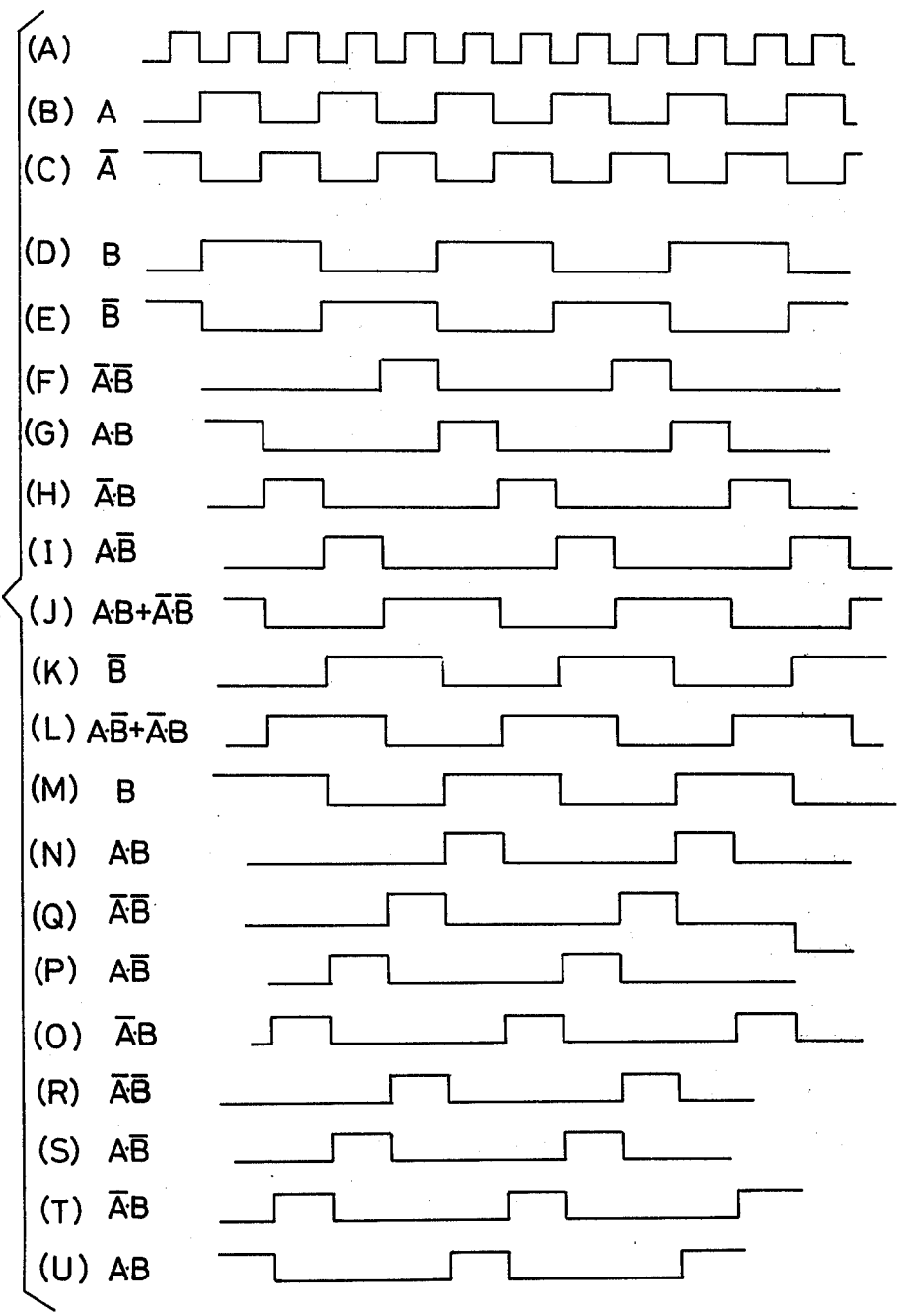
FIGS. 12(A) through 12(U) are pulse signal waveform diagrams respectively indicating the operation when the pulse motor is driven in the reverse direction.

FIG. 8 shows an embodiment of a pulse generating circuit for creating the pulse signals which are the source of the previously mentioned exciting currents. A train of clock pulses for determining the pulse motor current switching timing is shown in FIG. 11(A) (or FIG. 12(A)). These pulses are applied through an input terminal 40 to master-slave type flip-flop circuits 41 and 42.

In the flip-flop circuit 41, these clock pulses are counted down into one-half period. The pulse signals A and $\overline{A}$ (FIGS. 11(B) and 11(C)) are developed as its outputs. These signals are fed to an AND-NOR circuit 45 composed of AND circuits 43a, 43b and a NOR circuit 44.

A rotating directional signal is impressed on another input terminal 46 for controlling the rotating direction of the pulse motor. This signal is fed to the AND circuit 43b in the AND-NOR circuit 45 and to the AND circuit 43a via an inverter 47.

Either selected pulse signal, A or $\overline{A}$, is produced from the circuit 45 in response to the rotating directional signal state. The pulse signal is fed to terminals J2 and K2 of a flip-flop 42 in the following stage.

The flip-flop 42 is controlled in response to the pulse signals incoming through the terminals J2 and K2. Flip-flop 42 produces signals B and $\overline{B}$ as its output as shown in FIGS. 11(D) and 11(E) (or FIGS. 12(D) and 12(E)). These B-signals are obtained by counting down the pulse signals A and $\overline{A}$ into one-half period.

If the pulse motor is in the forward rotational mode, and the rotating directional signal level for the terminal 46 is high, signal $\overline{A}$ is selectively produced from the AND-NOR circuit 45 and is fed, in turn, to the input terminals J2 anad K2 of the flip-flop 42. Thus, signals B and $\overline{B}$ as shown in FIGS. 11(D) and 11(E) are produced from the circuit 42.

Figure 9:
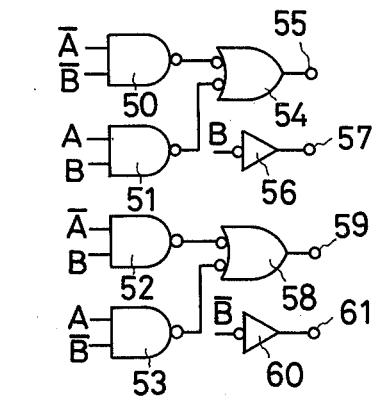
FIG. 9 is a circuit diagram of one embodiment of a main driving signal generating circuit.

FIG. 9 illustrates an embodiment of a main driving signal generator. Signals $\overline{A}$ and $\overline{B}$ of the previously mentioned signals A, $\overline{A}$ and B, $\overline{B}$ are applied to the gate of a NAND circuit 50. Similarly, signals A and B, $\overline{A}$ and B, and A and $\overline{B}$ are respectively applied to NAND circuits 51, 52, and 53.

Thus, a signal $\overline{A}.\overline{B}$ of the waveform shown in FIG. 11(F) is produced from the NAND circuit 50. A signal A.B. of the waveform shown in FIG. 11(G) is produced from the NAND circuit 51. These signals are applied to the gate of a NOR circuit 54. Therefore a 1-phase driving output signal A.B+$\overline{A}.\overline{B}$ as shown in FIG. 11(J) is obtained from an output terminal 55 of the NOR circuit 54 as its output. Further, a signal B is applied to an inverter 56. A two-phase driving output signal $\overline{B}$ shown in FIG. 11(K) is obtained from its output terminal.

From the outputs of the NAND circuits 52 and 53 signals $\overline{A}.B$ and A.$\overline{B}$ of waveforms shown in FIGS. 11(H) and 11(I) are obtained, respectively. These signals are applied to the gate of a NOR circuit 58. Therefore a three-phase driving output signal A.$\overline{B}$+$\overline{A}$.B of a waveform as shown in FIG. 11(L) is obtained from an output terminal 59 of the NOR circuit 58. Further, a signal $\overline{B}$ is applied to an inverter 60 and a four-phase driving output signal shown in FIG. 11(M) is obtained from its output terminal 61.

Next to be described is an auxiliary pulse signal generator circuit (FIG. 10) which varies the rotor stopping position by changing the level of the main driving signal. A rotating directional signal and a phase control signal are respectively applied to two input terminals 70 and 71 and are fed, directly and through inverters 74a and 74b, to an AND-NOR circuit composed of AND circuits 72a and 72b and a NOR circuit 73.

Provided that the pulse motor is running in normal direction, the rotating directional signal level is high. The phase control signal level in the advanced phase control period is high. A low-level signal from the output of the AND-NOR circuit 75 is fed to one-side of AND circuit pairs, 80a and 80b, 82a and 82b, 84a and 84b, and 86a and 86b, which constitute AND-NOR circuits 77, 78, 79 and 80. The low-level signal is applied both directly and through an inverter 76. On the other hand, signals $\overline{A}.B$ and $\overline{A.B}$ are applied in the other side of the AND circuits 80a and 80b of the AND-NOR circuit 77. As a result, an auxiliary first-phase signal A.B of the waveform shown at FIG. 11(N) can be derived from an output terminal 88 of the circuit 77. Similarly, signals $\overline{A.B}$ and $\overline{A}.B$ are applied to the AND-NOR circuit 78. An auxiliary second phase signal $A.\overline{B}$ shown in FIG. 11(O) is derived from an output terminal 89 of the circuit 78. Signals $A.\overline{B}$ and $\overline{A}.B$ are applied to the AND-NOR circuit 79. An auxiliary third phase signal $A.\overline{B}$ shown in FIG. 11(P) is derived from an output terminal 90. Signals $\overline{A.B}$ and A.B are applied the AND-NOR circuit 80 and an auxiliary fourth phase signal $\overline{A.B}$ shown in FIG. 11(Q) is derived from an output terminal 91.

The auxiliary signals shown in FIGS. 11(N) through 11(Q) are respectively phase-synchronized with the exciting phase sides of the former halves in the advancing direction of the main driving signals shown in FIG. 11(J) through 11(M). These signals are supplied to a pulse motor driving amplifier shown in FIG. 13 together with the main driving signals shown in FIG. 11(J) through 11(M), whereby a current of waveform shown in FIG. 6B is supplied to each phase exciting winding.

When the signal applied to the input terminal 28 is at low level, the pulse motor is rotated in the forward direction under the delay phase control. An auxiliary first phase signal $\overline{A}.B$ shown in FIG. 11(R) is derived from an output terminal 88 of the AND-NOR circuit 77. Similarly, an auxiliary second phase signal $\overline{A.B}$ shown in FIG. 11(S) is derived from an output terminal 89. An auxiliary third phase signal $\overline{A}.B$ shown in FIG. 11(T) is derived from an output terminal 90. An auxiliary fourth phase signal A.B shown in FIG. 11(U) is derived from an output terminal 91. The auxiliary signals shown in FIGS. 11(R) through 11(U) correspond to the exciting phase sides of the latter halves in the advancing direction of the main driving signal shown in FIG. 11(J) through FIG. 11(M) These signals are supplied to the pulse motor driving amplifier shown in FIG. 13 together with the main driving signals shown in FIGS. 11(J) through 11(M). A current of the waveform shown in FIG. 6C is applied to each of the phase exciting windings of the stator.

To reverse the rotating direction of the pulse motor, the rotating direction signal is at low level. The signals $A, \overline{A}, B, \overline{B}$ from the pulse generating circuit shown in FIG. 8 have waveforms shown in FIGS. 12B, 12C, 12D, and 12E. Accordingly, a first phase of the output driving signal $A.B+\overline{A.B}$ shown in FIG. 12(J) is derived from an output terminal 55 of the main driving signal generating circuit shown in FIG. 9. Similarly, a second phase output driving signal B shown in FIG. 12(K) is derived from an output terminal 57. A third phase output driving signal $A.\overline{B}+\overline{A}.B$ shown in FIG. 12(L) is derived from an output terminal 59. A fourth phase signal B shown in FIG. 12(M) is derived from an output terminal 61.

Auxiliary signals derived from output terminals 88 through 91 of the auxiliary signal generator shown in FIG. 10(B) will be as shown in FIGS. 12(N) through 12(Q) during the advancing control period, respectively. Thus an auxiliary first-phase signal A.B an auxiliary second-phase signal $\overline{A}.\overline{B}$, an auxiliary third-phase signal $\overline{A}.B$, and an auxiliary fourth-phase signal $\overline{A.B}$ of waveforms as shown in FIGS. 12(N), 12(O), 12(P), and 12(Q) are respectively derived from terminals 88, 89, 90, and 91.

On the other hand, for a delayed control period auxiliary signals derived from the output terminals 88 through 91 of the auxiliary signal generator, become as shown in FIGS. 12(R) through 12(U). Thus, an auxiliary first-phase signal $\overline{A}.B$ as shown in FIG. 12(R), an auxiliary second-phase signal $\overline{A.B}$ as shown in FIG. 12(S), an auxiliary third-phase signal $\overline{A}.B$ as shown in FIG. 12(T), and an auxiliary fourth-phase signal $\overline{A}.B$ as shown in FIG. 12(U) are derived respectively from the output terminals 88, 89, 90, and 91.

Figure 13:
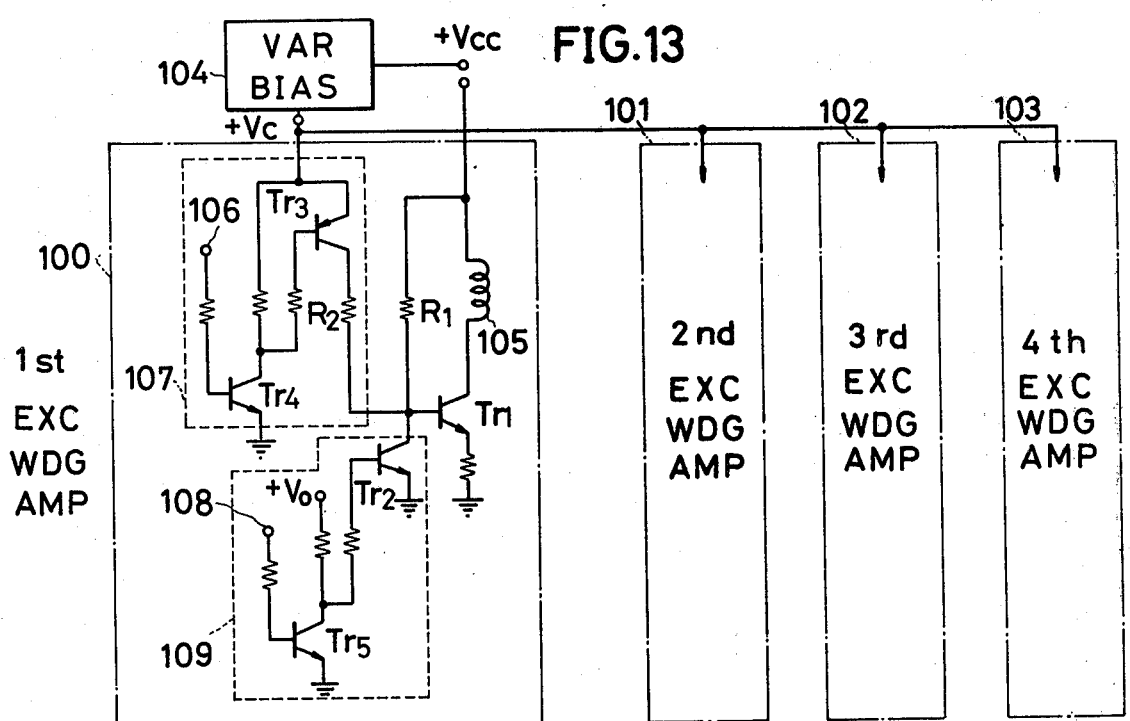
FIGS. 13 and 14 are circuit diagrams respectively showing embodiments of driving amplifier circuits for adjustment of the phase controlled position for the pulse motor stopping.

A description will now be presented in conjunction with FIG. 13 of a driving amplifier circuit which is fed with the previously mentioned main driving and auxiliary signals. The driving amplifier feeds a current, having different level portions in a single pulse in response to its control mode, to each excitation winding of a pulse motor, and to adjust the phase control amount for the motor stopping position. In FIG. 13, reference numerals 100, 101, 102, and 103 respectively designate the first, second, third, and fourth excitation winding amplifier circuits, each connected to a variable bias power source circuit 104.

All circuits 100 through 103 are of the same organization. Therefore, the first-phase excitation winding amplifier circuit 100 will be typically described.

First, to be considered is the operation in cases where only the main drive pulse is fed, and the auxiliary driving pulse is not fed. As illustrated, the first-phase excitation winding 105 is connected to the collector side of a power transistor Tr1. One end of the variable bias source circuit 104 and one end of the first-phase excitation winding 105 are both connected to a power supply +Vcc. The output of the circuit 104 is maintained at a potential +Vc. Since no auxiliary driving pulses are fed to the input terminal 106, both transistors Tr4 and Tr3 in the auxiliary excitation driving unit 107 are held in the nonconducting mode. A bias current for the transistor Tr1 is conducted via the resistor R1 from the power supply +Vcc.

Further, since no first-phase main driving pulses are applied to terminal 108, a transistor Tr5 in the main excitation driving unit 109 is turned off. The transistor Tr2, to which a bias is fed from the power supply +Vo, is turned on, while the transistor Tr1, having a grounded base is turned off.

On application of first-phase driving pulses, as shown in FIG. 11(J) or FIG. 12(J) to the terminal 108, the transistor Tr5 is turned on. The transistor Tr2 is turned off, while the switching transistor Tr1 is turned on.

Consequently, an exciting current having a constant level is applied from the power supply +Vcc to the first-phase excitation winding 105, whereby the pulse motor 14 is driven in either normal or reverse direction.

On the application of an auxiliary first-phase excitation pulse signal, as shown in FIGS. 11(N) and 11(R) or FIGS. 12(N) and 12(R), to input terminal 106, while an exciting current of the above-mentioned level is being applied to the excitation winding, the transistors Tr3 and Tr4 are turned on. Accordingly, a current from the variable bias source circuit 104 is furnished, together with the above-mentioned bias current to the base of the transistor Tr1, via the transistor Tr3 in the conductive state and the resistor R2. A result is that a current of much higher level is applied to the first-phase excitation winding 105.

The current for the excitation winding 105 may be varied by manually adjusting the output voltage of the variable bias source circuit 104. This variation may result from use of a variable resistor. In response to this adjustment, the stopping position of the pulse motor 14 can be suitably controlled.

Incidentally, a description above, of the previous embodiment, applies when both main driving and auxiliary pulse signal levels are high in the active mode. However, the same control operation is possible by the driving amplifier circuit shown in FIG. 14, even where both signal levels in the active mode are high, that is, when these control signals are reverse in polarity to those indicated in FIGS. 11 and 12. It is to be noted here that the same symbols used in FIG. 13 are affixed to equivalent component parts in FIG. 14.

It is assumed in the ordinary double excitation mode that an auxiliary first-phase signal applied to input terminal 106 is of high level. Transistors Tr6 and Tr7 are both turned on. The potential on the collector side of the transistor Tr7 is the high potential side of the power supply +Vcc. On the other hand, it is assumed that the main driving pulse applied to the main driving pulse input terminal 108 is of low level, and a transistor Tr8 is turned off. For this reason, a high-level bias current is fed via resistor R4 to the base of transistor Tr1. The first-phase excitation winding 105 is energized by a high-level current. The pulse motor is stopped at the double excitation stability point. As soon as an auxiliary pulse signal applied to the input terminal 106 becomes of a low level, transistor Tr6 is turned off, and similarly transistor Tr7 is turned off. For this reason, a potential which is lower in level than +Vcc is fed from the variable bias source 104 through diode D, a resistor R3, and a resistor R4, to the base of the transistor Tr1. Therefore, a low-level exciting current is fed to the first-phase excitation winding 105 and the pulse motor comes to a stop at a position displaced a predetermined angle from the double excitation stability point. The displacement occurs responsive to varying the output voltage +Vc of the variable bias source circuit 104.

Next to be described is an operation for suitably varying the rotor stopping position by adjusting the relative levels of the exciting currents simultaneously applied to the stator excitation windings of the pulse motor as mentioned above. The recording and reproducing apparatus shown in FIG. 1 operates in the following manner.

Figure 2:
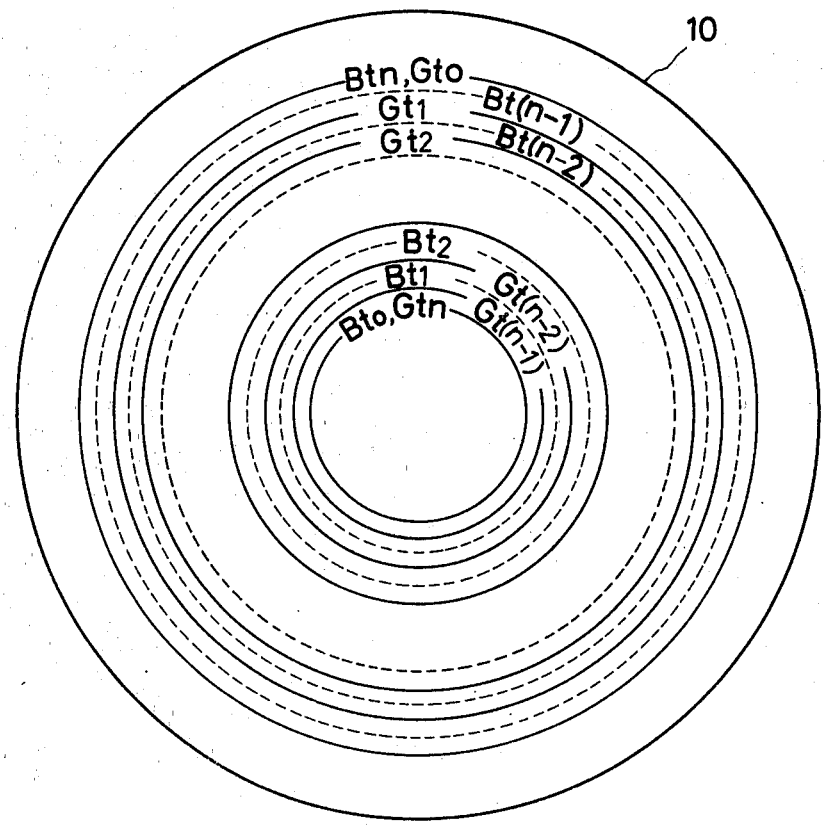
FIG. 2 is a planar view showing a track pattern of a rotating recording medium recorded by the recording and reproducing apparatus shown in FIG. 1.

In the recording mode period, the supply of an auxiliary driving signal with respect to the pulse motor driving amplifier circuit, shown in FIG. 13, is interrupted. Only the main driving signal, shown in FIGS. 11(J) through 11(M) or FIGS. 12(J) through 12(M), is fed thereto to set the waveform of an exciting current for each excitation winding, as shown in FIG. 6A and FIG. 7A. Thus the pulse motor 14 rotates in the ordinary driving mode, stopping at the double excitation stability point, resulting in the formation of a track pattern on a magnetic disc 10 as illustrated in FIG. 2.

Next, it will be supposed that a pre-recorded track is not accurately followed. A recorded magnetic disc 10 may have warped slightly if it has been stored for a long period of time. It may be mounted for reproduction on the same apparatus that was used for recording. Or, a magnetic disc recorded by one apparatus is mounted on a different apparatus for reproduction.

In such a case, the relative positions between a recording track and a magnetic head may deviate. The magnetic head may fail to accurately track, and a stabilized reproduced picture may not be obtained. In the reproduction mode, it is necessary to select a positional control signal in response to the relative positional direction of the magnetic head with respect to the recording track. The main and auxiliary driving signals are supplied to the pulse motor driving amplifier circuit. These pulses operate both the main and auxiliary excitation driving units 107 and 109. It is further necessary to adjust the value of the ouput voltage +Vc of the variable bias source circuit 104 by a manual operation. This adjustment displaces the stopping position of the pulse motor 14 or the magnetic head 15 in the phase advancing or retarding direction from the stopping position in the recording mode. In this case, the amount of the displacement of the magnetic head 15, from the normal stopping position, is governed by the value of the output voltage +Vc of the variable bias source circuit.

A proper tracking operation and normal reproduction become possible by varying the bias source voltage +Vc and adjusting this displacement for maximum reproduced output of the magnetic head 15.

Incidentally, it has been assumed in the foregoing description that the pulse motor drive system, according to this invention, has been applied to an apparatus adopting the so-called two-pulse feeding system. That is a system in which a pulse motor is ordinarily driven by two-pulse units. A recording track is formed on a recording disc by applying one pulse so that the forward and reverse travelling tracks may be disposed alternately by the head forward and reverse operation, when the head travel direction reverses at the innermost or the outermost peripheral position.

It will be obvious to those skilled in the art that this invention can also find application when there are two magnetic heads in contact with the top and bottom surfaces, respectively, of a magnetic disc. These two heads are driven by two separate pulse motors or by the so-called excitation switching system. That is a system in which the pulse motor excitation system is changed between the forward and reverse travellings of a magnetic head on a magnetic disc so that the forward and reverse tracks are formed alternately.

If the present invention is applied to the latter system, it is necessray for the main drive signal generator, shown in FIG. 9, to be designed to be switchable between a double excitation pulse generator circuit or a single excitation pulse generator circuit. Further, the output signals of the auxiliary signal generator shown in FIG. 10 can similarly perform phase adjustment of the magnetic head. The phase adjustment can advance or retard the excitation phase, with respect to the rotating direction of the rotor, in controlling the advancing or retarding phase control period of the pulse motor.

A recording system applicable to the previously mentioned advanced and retarded phase control system (the unbalanced double excitation control system), and for forming the forward and reversed recording tracks concentrically and alternately on a recording disc, will now be described. In an ordinary double excitation system pulse motor, the positional relationships between the stator assembly 30 and the rotor 31 are as illustrated in FIG. 3. If I-phase and II-phase stators 30a and 30b of the stator assembly 30 are energized, the rotor 31 is held in the position indicated by the solid line. As a pair of excitation phases are switched to another pair, or II and III phases, the rotor 31 is rotated one step angle θ in a clockwise direction to reach the position indicated by the dotted line. When the rotor 31 comes to a stop, each magnetic pole confronts its respective stator of excitation phase of the stator assembly 30, to cover a uniform angle of θ/2° in the peripheral direction.

Figure 10:
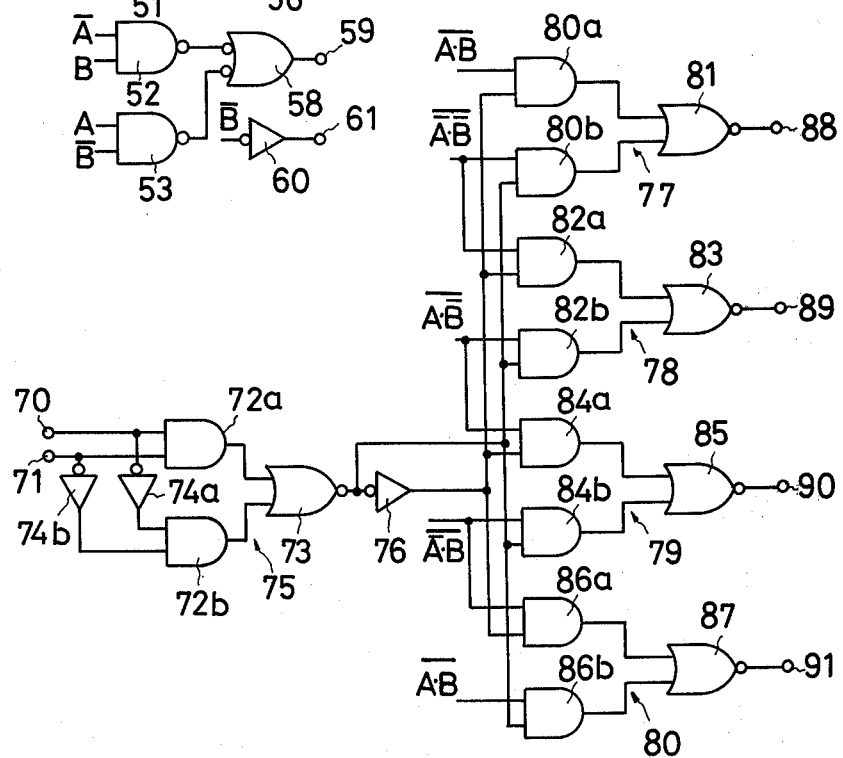
FIG. 10 is a circuit diagram of one embodiment of an auxiliary signal generating circuit.
Figure 14:
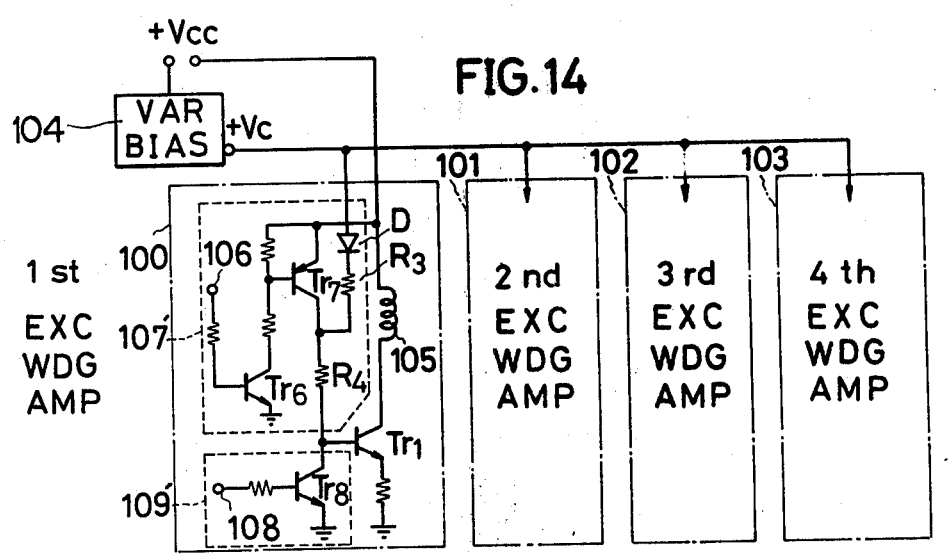

It will now be supposed that the excitation phases are energized in successive pairs, I and II → II and III → III and I, in order to rotate the rotor 31 intermittently in the clockwise direction. The auxiliary signal generator, shown in FIG. 10, is operated. The output voltage of the variable bias source shown in FIG. 13 or FIG. 14 is adjusted to set a larger current level for the preceding excitation phase, than that for the succeeding excitation phase.

Figure 15A:
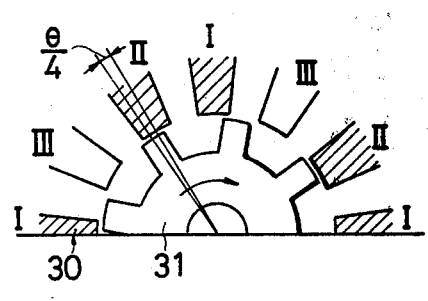
FIGS. 15A and 15B are diagrams for describing the rotor stop positional relationships at the time of unbalanced excitation of a three-phase, double-excitation type pulse motor.

When a pair of excitation phases are energized unevenly in this manner, the rotor 31 comes to a stop at a position which is slightly displaced clockwise, along the curve Ⓒ in FIG. 5B, relative to the stopping position shown in FIG. 6 for balanced excitation. It will be assumed here that the exciting currents for the preceding and succeeding excitation phases are suitably set. Then the rotor 31 comes to a stop at a position (the intermediate stop position X in FIG. 5B), rotated θ/4° in the clockwise direction, from the balanced excitation stop position, as shown in FIG. 15A.

Figure 16A:
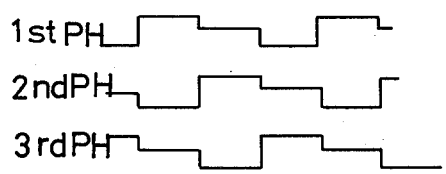
FIGS. 16A and 16B are time charts illustrating level variations, with respect to time, of currents when the pulse motor shown in FIGS. 15A and 15B is in the unbalanced excitation driving mode in the clockwise and the counterclockwise direction, respectively.

On application of pulse signals, as shown in FIG. 16A, to the pulse motor, the three excitation phases are successively energized in pairs such as I and II phases, II and III phases, and III and I phases. The current level of the preceding excitation phase is invariably greater than that of the succeeding excitation phase.

Thus, the rotor 31 is driven intermittently in the clockwise direction, stopping at a position (intermediate stopping position X) advanced a predetermined angle from the normal stopping position.

Figure 15B:
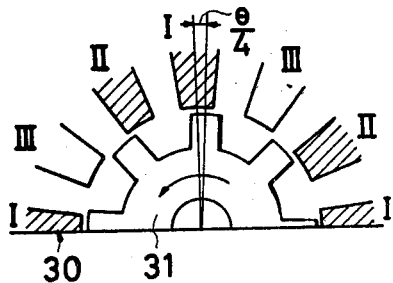

It will now be supposed that the excitation phases are energized in such pairs as II, I → I, III → III, II for the purpose of turning the rotor 31 counterclockwise. At the same time, the current level for the preceding excitation phase is greater than that for the succeeding excitation phase. When the excitation phases are energized unevenly in such a manner, the rotor 31 will come to a stop at a position which is rotated counterclockwise a predetermined angle along the curve Ⓓ in FIG. 5B, from the stopping position for balanced excitation, as shown in FIG. 3. It will be assumed further that the exciting currents for the preceding and succeeding excitation phases are suitably set. Then the rotor 31 comes to a stop at a position (the intermediate position Y in FIG. 5B) rotated θ/4° counterclockwise from the stopping position for balanced excitation as shown in FIG. 15B.

Figure 16B:
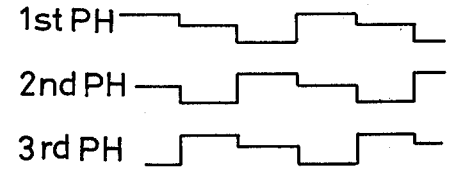

Upon the application of the pulse signals as shown in FIG. 16B, to the pulse motor, the three excitation phases are energized in succession in pairs such as II, I → I, III → III, II. At the same, the auxiliary signal generator, shown in FIG. 10, and the variable bias source 104, shown in FIG. 13, are both operated so that the current level for the preceding excitation phase is invariably higher than that for the succeeding excitation phase. Thus, the rotor 31 rotates counterclockwise, stopping at a position, i.e., the intermediate stop position, advanced a predetermined angle from the normal stopping position.

It will be understood here that the characteristic curves shown in FIGS. 5A and 5B become different, depending on the kinds of the pulse motors. A small-angle, high-torque, composite-type pulse motor may have a rotor consisting of a plurality of permanent magnets. A number of slots or teeth are cut in the outer periphery of the rotor and in the inner periphery of the stator. The relationships between the rotor deflection stop angle and the excitating current value can be represented by an approximately linear characteristic curve.

Accordingly, if the above-mentioned pulse motor is applied to the apparatus according to this invention, the summation exciting current $2I_o$, to be applied to a pair of excitation phases to be energized, should be split into two parts in the ratio of 2:1 so that $4/3I_o$ and $2/3I_o$ will be applied to the preceding and succeeding excitation phases. Then, during clockwise or counterclockwise rotating periods, the rotor rotates intermittently, stopping at a position which is a quarter of one step rotating angle in front of the stopping position for the balanced excitation driving period.

Now the operation of the pulse motor when driven in such an unbalanced mode will be analyzed in conjunction with FIGS. 17(A) through 17(K).

Figure 17:
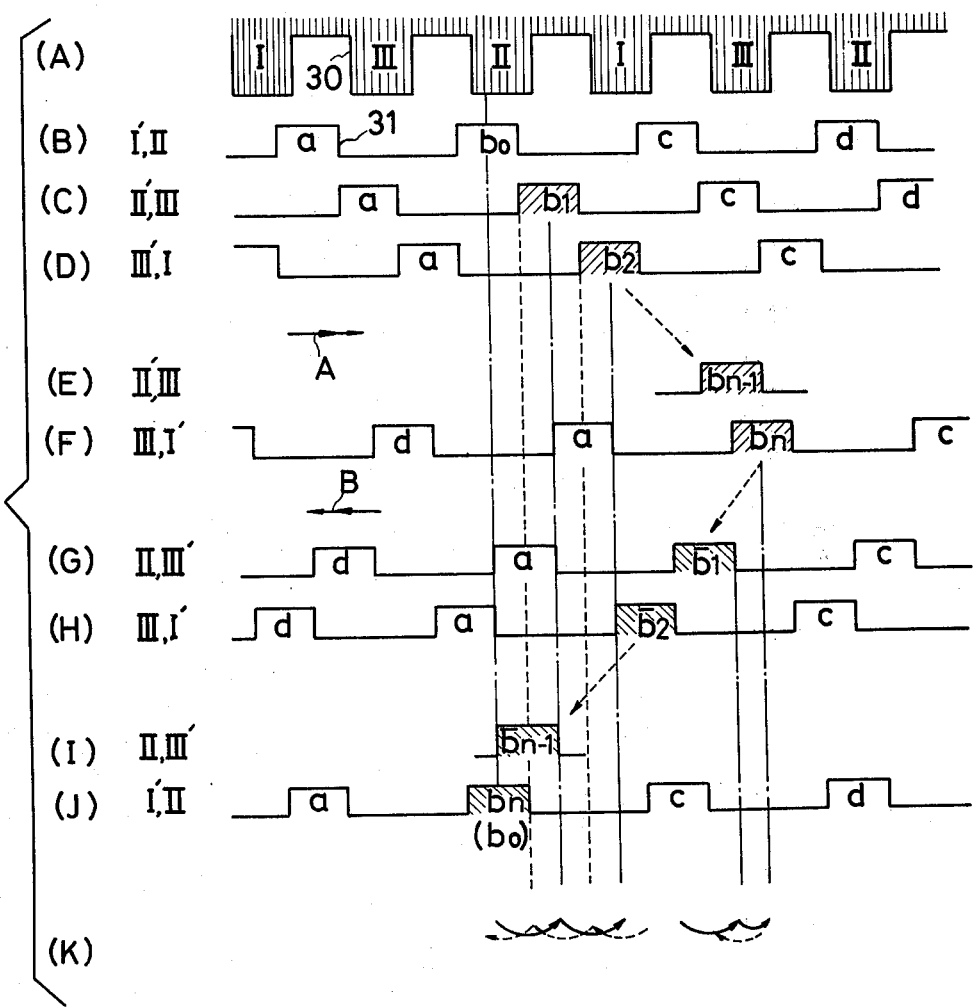
FIGS. 17(A) through 17(K) are timing charts for a description of rotor stop positional relationships, with respect to the stator, when a three-phase, double-excitation type pulse motor is driven in the unbalanced excitation mode.

FIG 17(A) shows a development of the stator of the pulse motor, wherein I, II, and III represent respectively the first, second, and third phase excitation winding poles. FIGS. 17(B) through 17(J) show the rotor stop positional relationships with respect to the stator 30, shown in FIG.17(A), when the pulse motor 14 is in the balanced two-phase excitation driving mode, wherein $a$, $b$, $c$, and $d$ designate teeth portions of the rotor 31. It is to be understood that these teeth $a$, $b$, and $c$ are arranged at equal intervals. The widths of these teeth or the excitation winding poles I, II, and III are made equal.

In the following description, it will be assumed that the previously mentioned large exciting currents are identified by the unprimed I, II, and III phases. Exciting currents equal to approximately one-half of the above-mentioned large exciting currents are identified by the primed I, II, and III phases.

The pulse signals shown in FIG.16A are applied to energize the excitation windings of the stator 30 in succession as I', II → II', III → III', I in order to drive the pulse motor 14 in the clockwise direction. The rotor 31 rotates intermittently in angular steps of θ degrees in the clockwise direction, stopping at a position which is advanced θ/4° from the stopping position for the balanced excitation driving period, as shown in FIGS.17(B), 17(C), and 17(D).

As the excitation is accomplished successively, and the II and II' phases are energized, the rotor 31 reaches the position shown in FIG.17(E). During this intermittent rotary movement, a particular tooth $b$ of the rotor is displaced intermittently as $b_0, b_1, b_2, \ldots b_{n-1}$. In this case, the time axis shifts as shown by the single dot chain lines. Thus, the head 15 is stepped by the pulse motor 14 in a manner as shown by the arrowed solid line arrow in FIG.17(K). It is assumed here that the head 15 is designed to displace a two-track pitch interval for each forward step of the pulse motor 14. Therefore the head 15 is moved, in its forward stepping movement, from the innermost peripheral track G to towards the external peripheral tracks, in succession, at two-track pitch intervals, as shown by the solid line in FIG.2. The head stops on the disc at a position which is displaced 1/2 track in the external peripheral direction away from the stopping position which occurs responsive to the balanced excitation driving period. Thus the forward tracks $Gt1, Gt2, Gt3, \ldots Gt(n-1)$ are successively formed as shown by the solid line.

As soon as the head 15 reaches a position for tracing next to the innermost track, i.e. $Gt(n-1)$, a detecting means operates. Pulse signals shown in FIG.16B are applied to the pulse motor for reversing the rotating direction. The III and I' phase excitation windings of the stator are thus energized. The rotor 31, however, comes to a stop at a position shown in FIG.17(F), or a position which is one step rotated in the same direction as the previous direction of rotation, that is, rotated one-half of the previous step angle, or $\theta/2°$. For this reason, the inwardly stepping head 15 which has traced the track $Gt(n-1)$ is transferred to the outwardly stepping external direction of the disc by one track pitch, thereby forming the innermost peripheral track Gtn.

As the II, III' → III, I' → . . . → II, III' phases are energized in succession, the rotating direction of the motor is reversed; or it rotates in the counterclockwise direction. The rotor 31 intermittently rotates counterclockwise as indicated in FIGS.17(G), 17(H), and 17(I), in steps of $\theta°$, stopping at a position leading $\theta/4°$ from the stopping position for the balanced excitation driving period.

In this case, a particular tooth $b$ of the rotor 31 moves intermittently as $b1, b2, \ldots bn-1$. The time axis is displaced, as indicated by the dotted line. Accordingly the head 15 is transferred as shown by the dotted line arrow in FIG. 17(K). The head is intermittently moved, step by step, stopping at positions on the disc which are displaced a one-half track pitch, in the inner peripheral direction, from the stopping position which normally occurs for the balanced excitation driving period of the motor.

Therefore, in its reverse movement, the head 15 steps intermittently, stopping at each intermediate position of the aforementioned tracks $Gt(n-1), Gt(n-2), \ldots Gt1$. Thus, the reverse tracks $Bt1, Bt2, \ldots Bt(n-2), Bt(n-1)$ are formed alternately between the above-mentioned tracks $Gt(n-1), Gt(n-2), \ldots Gt2$, and $Gt1$, as shown by the dotted lines in FIG.2.

As soon as the head 15 reaches a position for tracing the track $Bt(n-1)$ which is next to the outermost periphery, a detecting means operates. Pulse signals, shown in FIG.16A, are applied to the pulse motor to reverse its rotating direction. The I' and II phase excitation winding of the stator are energized. The rotor 31, however, comes to a stop at a position which is one step rotated in the same direction as the previous rotating direction. That is, the head stops at a position which is rotated one-half of the previous stepping angle, or $\theta/2°$, as shown in FIG.17(J). Accordingly, the head 15 which has traced the track $Bt(n-1)$ is transferred one track pitch toward the inner periphery. The outermost peripheral track $Btn$, conforms to the previous track Gto.

This is followed by the excitation of II', III phase → III', I phase, and so forth, in succession. The head 15 is again transferred, stopping to trace the same tracks which were formed in the forward stepping movement.

Thus a plurality of concentrically disposed tracks are formed during the forward and reverse movements of the head 15. These tracks are formed alternately on the magnetic disc 10, and the video signal recording is carried out endlessly.

When reproducing video signals recorded on a plurality of concentrically arranged tracks of a recorded medium, the head traces the recorded tracks sequentially and repeatedly. As a result, a continuous picture is reproduced repeatedly.

In the foregoing description of the embodiment of this invention, it is stated that, in the forward movement of the head, the rotor rotates step by step from the stop position shown in FIG.17(E) to that shown in FIG.17(F). However, each of the tracks traced during forward stepping is formed between tracks traced during the reverse stepping, even where the rotor rotates in steps from the stop position shown in FIG.17(E) to that shown in FIG.17(G).

Further, the reversing operation which transfers the direction of the head may be carried out by providing a circuit for counting the pulses applied to the pulse motor instead of by means of the detecting means as mentioned previously. Thus, a switching means is provided at the predetermined positions. Such a pulse counting circuit can count automatically, a predetermined number of pulses applied to the motor.

The three-phase, double-excitation system pulse motor applicable to the above described apparatus comprises a pulse generator circuit and a pulse motor driving amplifier circuit, as shown in FIGS.8 through 14. It will be understood that the output voltage $+Vc$ of the variable bias source circuit, shown in FIG.13 or 14, can be varied by manual control of a variable resistor, etc. The exciting currents for the preceding and succeeding excitation phases are predetermined so as to be about 2:1. By this setting operation, the rotor stopping position can be displaced, in either the clockwise or counterclockwise rotation period of the rotor, by an angle $\theta/4$ in the leading direction from the balanced double excitation stability position.

Even with the above-mentioned apparatus, it is feasible, in reproduction, to displace the stopping position of the pulse motor 14 or the magnetic head 15 in the phase leading or lagging direction.

Proper tracking operation, as described previously, becomes possible by adjusting the reproduced output to a maximum.

In the above described embodiment of this invention, the rotor stopping position is set at a leading position which is displaced from the stopping position due to the balanced excitation system. Therefore, a damping action operates for effectively stopping the rotor. Hence, it is not necessary to have a damper or the like for the prevention of hunting.

Further, this invention is not limited to these embodiments. Various modifications may be made without departing from the scope and spirit of the invention.

What is claimed is:

1. A recording and/or reproducing apparatus of the type using a rotating recording medium, said apparatus comprising:

a recording medium, a transducer, and means for rotating said medium at a predetermined speed;

means for mounting said transducer to trace predetermined tracks over the rotating recording medium to record or reproduce signals;

means comprising a multi-phase excitation pulse motor having a plurality of stator windings and an associated rotor for operating intermittently;

means responsive to the operation of said pulse motor means for moving the transducer means intermittently, either toward the inner periphery of the recording medium or toward the outer periphery of the recording medium;

means for supplying first mutually unequal exciting currents, in a predetermined sequence, through the stator windings to intermittently rotate the rotor of the pulse motor in a forward direction, each forward rotation of said rotor moving said transducer means over a space equal to a two-track pitch interval, with motion toward the inner periphery of the rotating recording medium; and means for thereafter successively supplying second mutually unequal excitation currents, in a sequence which is reverse to said predetermined sequence, through the stator windings to intermittently rotate the rotor in the reverse direction, each reverse rotation of said rotor moving said transducer means over a space equal to a two-track pitch interval, with motion toward the outer periphery of the recording medium, said first and second mutually unequal exciting currents displacing the transducer means over a space equal to an odd-number of track pitches at a moment when the mutually unequal exciting currents supplied through the stator windings are changed over from the first mutually unequal exciting currents to the second mutually unequal exciting currents and vice versa;

whereby said transducer means forms and traces alternate concentric tracks, respectively, on said recording medium as said transducer is stepped intermittently toward the inner and outer periphery of said recording medium.

2. The recording and/or reproducing apparatus as claimed in claim 1 in which the unequal exciting current supplying means comprises main pulse generating means for successively generating mutually equal periodic pulses, each main pulse having a predetermined width; auxiliary pulse generating means for successively generating auxiliary pulses, each auxiliary pulse having a width which is narrower than said predetermined width; driving means responsive to the mutually equal main pulses and the auxiliary pulses which are supplied simultaneously from said main pulse generating means and said auxiliary pulse generating means, said drive means generating exciting currents having a magnitude and width corresponding to a superimposed position of the main pulses and the auxiliary pulses, and means for supplying the exciting currents through the stator windings of said pulse motor, whereby the rotor of the pulse motor steps intermittently and stops at positions which are displaced either in front of or behind positions in which the rotor would stop if it were energized responsive only to the main pulses.

3. The recording and/or reproducing apparatus as claimed in claim 2 in which the driving means further comprises control circuit means having a transistor which is connected in series with the respective stator windings of the pulse motor, first control circuit means connected to apply base bias to the transistor responsive to mutually equal, successive periodic pulses, second control circuit means connected to apply base bias to the transistor responsive to successive auxiliary pulses, and means for energizing said stator winding with current in accordance with the base bias applied to the transistor.

4. A recording and/or reproducing apparatus of a type using a transducer head, a rotating recording medium, and a head transport mechanism for moving said head across said medium, said apparatus comprising:

means for rotating said recording medium at a predetermined speed;

means for moving said transducer head transport mechanism so that said head traces over the rotating recording medium to record or reproduce signals in predetermined signal tracks;

means comprising a multi-phase excitation pulse motor having a plurality of stator windings and an associated rotor for operating intermittently responsive to successive drive pulses;

means for operating said transport moving means responsive to each intermittent operation of said pulse motor;

means for supplying drive pulses of mutually unequal exciting currents, in a predetermined sequence, through the stator winding to intermittently rotate the rotor of the pulse motor in one direction in equal angular steps of $\theta°$, thereby moving said transducer means a predetermined distance toward the inner periphery of the rotating recording medium responsive to each drive pulse; and means for changing over the sequence of said supply means and thereafter successively supplying the mutually unequal excitation currents, in a sequence which is reverse to said predetermined sequence, through the stator windings to intermittently rotate the rotor in the opposite direction in equal angular steps of $\theta°$, thereby moving said transducer means said predetermined distance toward the outer periphery of the rotating recording medium responsive to each drive pulse of reverse sequence, said rotor stopping at selected positions which are $\theta/4°$ either in front of or behind the positions in which the rotor would stop responsive to an equal excitation of the stator windings;

whereby said transducer head transport steps intermittently toward either the inner periphery or the outer periphery of the rotating recording medium, stopping at selected positions which are $\theta/4°$ either in front of or behind the stopping positions of the transducer means which would otherwise occur responsive to an equal excitation of said multi-phase excitation pulse motor means, said transducer head thereby forming and tracing concentric tracks which are alternately traced depending upon whether said head is moving toward the inner or the outer periphery of the rotating recording medium.

* * * * *